United States Patent [19]
Knox

[11] Patent Number: 6,042,139
[45] Date of Patent: Mar. 28, 2000

[54] INTEGRAL PSIR DOOR FOR AN INSTRUMENT PANEL AND METHOD FOR MAKING SAME

[75] Inventor: Jonathan P Knox, Rochester, N.H.

[73] Assignee: Textron Automotive Company Inc., Troy, Mich.

[21] Appl. No.: 09/026,114

[22] Filed: Feb. 19, 1998

[51] Int. Cl.[7] ............................................ B60R 21/20
[52] U.S. Cl. ........................................ 280/728.3; 280/732
[58] Field of Search ............................ 280/732, 728.3, 280/728.1

[56] References Cited

U.S. PATENT DOCUMENTS

| | | |
|---|---|---|
| 4,893,833 | 1/1990 | DiSalvo et al. ................ 280/732 |
| 4,973,081 | 11/1990 | Rafferty . |
| 5,096,221 | 3/1992 | Combs et al. . |
| 5,158,322 | 10/1992 | Sun . |
| 5,252,164 | 10/1993 | Mills . |
| 5,350,191 | 9/1994 | Kokeguchi et al. . |
| 5,398,959 | 3/1995 | Avila ............................ 280/728.3 |
| 5,421,608 | 6/1995 | Parker et al. . |
| 5,433,474 | 7/1995 | Farrington et al. ............ 280/728.3 |
| 5,447,327 | 9/1995 | Jorboe et al. . |
| 5,458,361 | 10/1995 | Gajewski . |
| 5,478,107 | 12/1995 | Yamagishi et al. ............ 280/728.3 |
| 5,533,738 | 7/1996 | Wirt et al. . |
| 5,544,912 | 8/1996 | Sommer . |
| 5,590,901 | 1/1997 | MacGregor . |

FOREIGN PATENT DOCUMENTS 6-219232  8/1994  Japan .................................. 280/728.3

*Primary Examiner*—Eric Culbreth
*Attorney, Agent, or Firm*—Reising, Ethington, Barnes, Kisselle, Learman & McCulloch, P.C.

[57] ABSTRACT

An air bag cover assembly comprises a flexible plastic air bag door closing an air bag deployment opening in a hard plastic retainer. A door outer edge abuts and is mechanically locked to an inner edge of the opening. The interlock comprises a protrusion in the door outer edge, which mates with a complementary recess in the inner edge of the opening. The interlock blocks outward and inward air bag door movement. The door and retainer are made of plastics, which generally do not adhere easily to one another. Silicone may be sprayed on the door outer edge to further reduce adhesion or where plastics, which generally adhere to one another, are used. Preferably, the exterior and interior surfaces of the door and retainer lie flush with one another. The door includes a flexible hinge flange that extends from an interior door surface and attaches the door to the vehicle structure. The hinge flange allows the door to swing outward upon air bag deployment while retaining the door to the vehicle structure. A steel door insert may be included to add rigidity, strength or dimensional stability to the door. The assembly is constructed by molding molten retainer material in a mold cavity that contains the door so that the retainer material flows around the door to form the mechanical interlock.

20 Claims, 3 Drawing Sheets

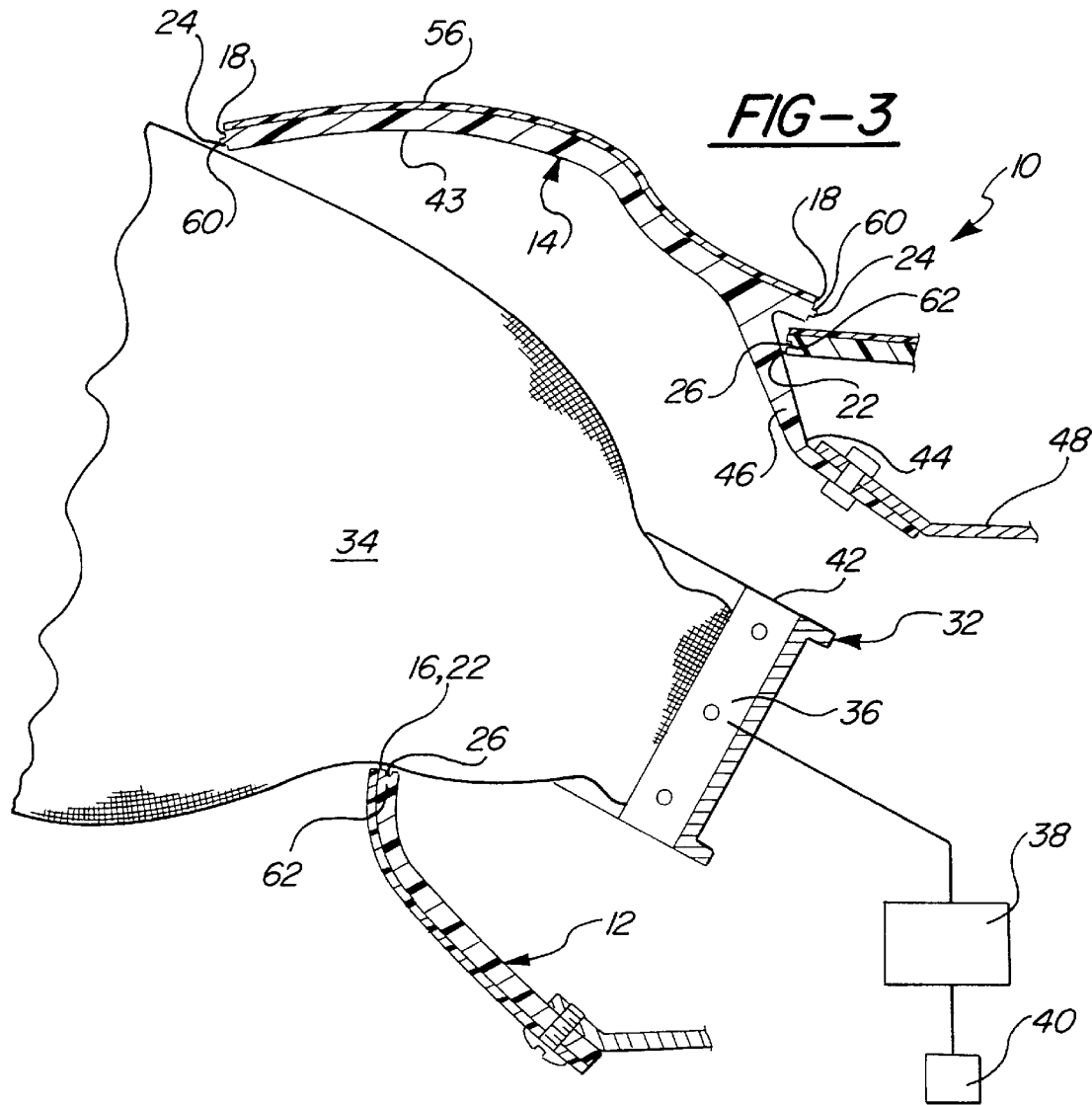
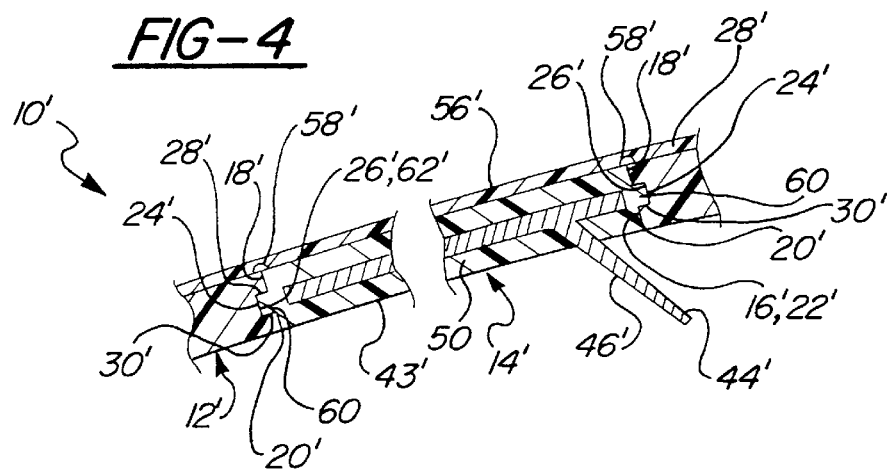

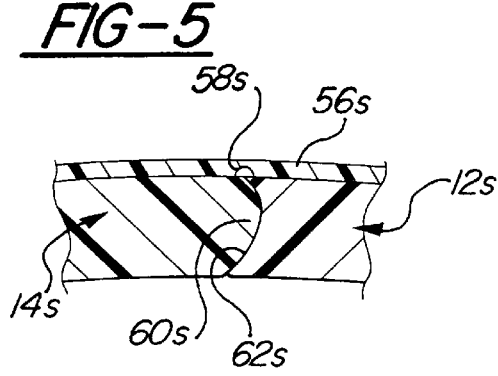
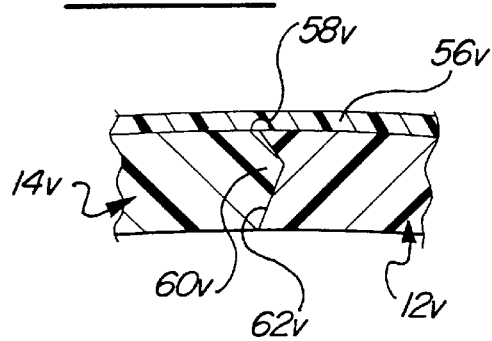
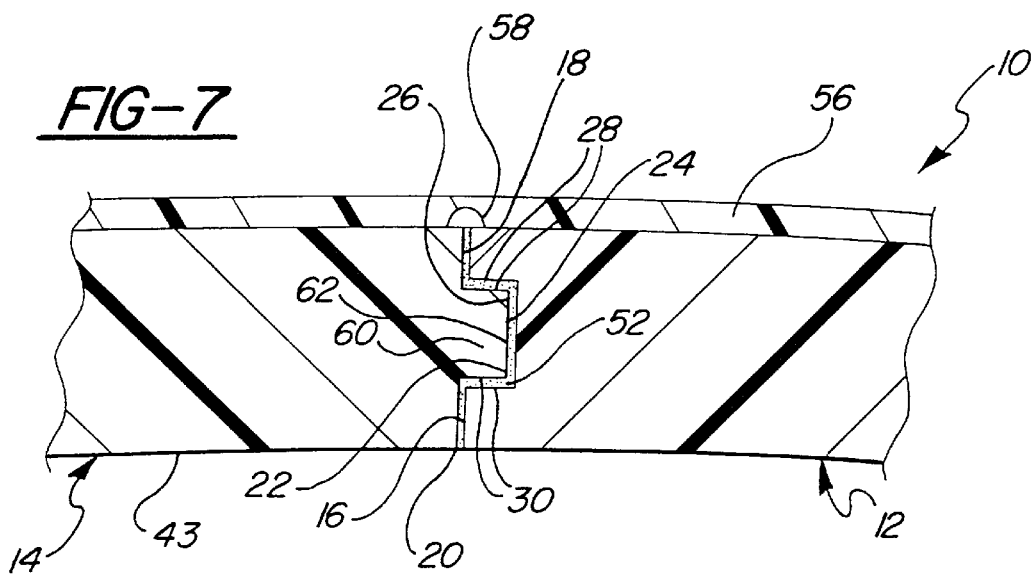
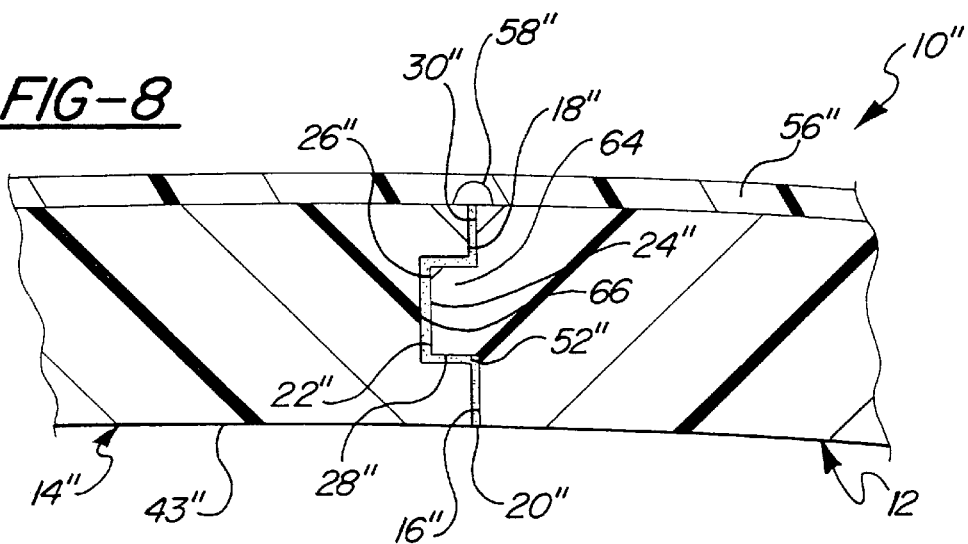

INTEGRAL PSIR DOOR FOR AN INSTRUMENT PANEL AND METHOD FOR MAKING SAME

TECHNICAL FIELD

This invention relates generally to air bag cover assemblies and, more particularly, to a retainer for an air bag cover assembly. The invention also relates to a method of molding the retainer so it includes an integral door which provides an air bag deployment opening within the retainer when the air bag impacts the door during air bag inflation.

INVENTION BACKGROUND

Many automotive vehicles have both a driver's-side air bag assembly deployably stored within a steering wheel and a front passenger's-side air bag assembly deployably installed in or behind a passenger-side instrument or dash panel. In manufacturing such passenger-side instrument panels, a separate door or other closure is normally provided within a rigid retainer, insert or substrate that forms a portion of the instrument panel. The door serves to conceal and prevent occupants from tampering with the air bag assembly. It is well known to connect such an air bag door to a retainer by using separate fasteners. It is also well known to weaken a section within the door or along one side of the door to allow the door to tear free from its support and pivot into an open position under the force of the inflating air bag. Although arrangements of this sort for connecting the door to a main portion of the retainer permit the door to open and function properly, the use of separate fasteners for joining the door to the retainer increases instrument panel manufacturing and assembly cost. In addition, making the door as a separate part creates an inherent fit and finish problem.

To reduce manufacturing cost and to improve fit and finish, air bag cover assemblies have been developed that do not require separate fasteners to join air bag doors to support structures such as retainers, inserts or substrates. An example of such a system is found in U.S. Pat. No. 5,458,361 issued Oct. 17, 1995 to Gajewski (the Gajewski patent). The Gajewski patent discloses an air bag door that is integrally formed in a like-shaped opening in an insert panel. The door has an outer edge that forms a seam against an inner edge of the insert opening. The door is made of a material that bonds with the insert along at least a portion of the seam. There is also a mechanical interlock between the door and the insert along at least a portion of the seam. The mechanical interlock comprises interlocking dovetails extending integrally outward from the door outer edge and integrally inward from the insert opening inner edge. In one embodiment, the dovetailed mechanical interlock serves as a hinge when the door is forced open by air bag inflation. The configuration of the dovetailed mechanical interlock resists outward movement of the door, but does not resist inward movement of the door relative to the insert. In other words, if there was no adhesive bond between door and insert the mechanical interlock would not support the door in the insert against inwardly directed forces.

The Gajewski insert and door are formed by first injecting molten insert material into a mold cavity. As the insert material is being injected, the area to be injected with door material is partitioned by retractable divider blades, some of which also serve to form dovetails along a portion of the inner edge of the insert opening. Once the insert material has hardened, the divider blades are retracted to expose the inner edge of the insert opening and the insert dovetails. Door material is then injected into the mold cavity in the region that the blades had previously partitioned. The door material adheres to the inner edges of the insert opening forming a butt joint. The door material also flows around the insert dovetails to form mechanically interlocked door dovetails. Exterior class A surfaces, i.e. surfaces visible to vehicle occupants, of the Gajewski door and insert lie flush with one another. However, the interior surfaces of the Gajewski door and insert are interrupted by a protrusion extending integrally inward from along the mechanically interlocked regions of the seam. The Gajewski patent is assigned to the assignee of the present invention and is incorporated herein by reference.

U.S. Pat. No. 5,590,901 issued Jan. 7, 1997 to MacGregor (the MacGregor patent) also discloses a method of making a retainer or substrate with an integral door. However, unlike the Gajewski patent, an air bag door and trim panel substrate are formed separately and then the door is inserted and adhesively bonded to the substrate.

What is needed is a retainer having an integral air bag door that is removably held in place in an air bag deployment opening in the retainer by simple non-adhesive means and without using separate fasteners to join door to retainer. What is also needed is simple method for making such a door.

INVENTION SUMMARY

According to the present invention an air bag cover assembly is provided that includes a mechanical interlock between a door outer edge and an inner edge of an air bag deployment opening. The mechanical interlock prevents both inward and outward air bag door movement relative to the retainer. The air bag deployment opening is disposed in a retainer. The air bag door is formed into and closes the air bag deployment opening. The door outer edge abuts and forms a seam with the inner edge of the air bag deployment opening.

The mechanical interlock between the air bag door and the retainer comprises a first profile formed in the air bag door outer edge and a complementary second profile formed in the inner edge of the air bag deployment opening. The first profile is disposed in a mating relationship with the second profile. A first pair of opposed surfaces is disposed on the respective first and second profiles. The surfaces of the first pair of opposed surfaces cooperate to block outward air bag door movement relative to the retainer. A second pair of opposed surfaces is disposed on the respective first and second profiles. The surfaces of the second pair of opposed surfaces cooperatively block inward air bag door movement relative to the retainer. The mechanical interlock supports the air bag door in the retainer against both inwardly and outwardly directed forces without adhesively bonding the air bag door to the retainer and without using separate fasteners to connect the air bag door to the retainer.

According to another aspect of the present invention the door is made of a door material and the retainer is made of a retainer material. The door material has a low bond strength with the retainer material. This allows the door to separate more cleanly from the retainer when forced out by air bag inflation.

According to another aspect of the present invention the assembly preferably includes a skin adhesively applied across the retainer and door exterior surfaces to provide an aesthetically pleasing, finished appearance and to conceal the seam.

According to another aspect of the present invention the skin may be weakened along a region adjacent the seam to guide tearing during air bag deployment. Grooving, laser scoring or any other suitable method known in the art may accomplish the weakening.

According to another aspect of the present invention a layer of an adhesion inhibitor such as silicone is disposed between the air bag door outer edge and the inner edge of the air bag deployment opening. The adhesion inhibitor keeps the respective door and opening edge surfaces from adhering and interfering with door opening during air bag deployment.

According to another aspect of the present invention the exterior class A surfaces of the door and insert lie flush with one another.

According to another aspect of the present invention the interior surfaces of the door and retainer lie flush with one another.

According to another aspect of the present invention the first profile comprises a protrusion or ridge extending integrally outward from along the door outer edge and the second profile comprises a complementary recess in the form of a groove disposed along the inner edge of the air bag deployment opening. The protrusion is disposed in a mating relationship with the complementary recess and forms an abutment interface between the door and the retainer. The first pair of opposed surfaces is disposed on an upper portion of the interface. The second pair of opposed surfaces is disposed on a lower portion of the interface.

According to another aspect of the present invention the second profile may comprise a protrusion extending integrally inward from along the inner edge of the air bag deployment opening. The first profile comprises a complementary recess disposed along the door outer edge. The protrusion is disposed in a mating relationship with the complementary recess and forms an abutment interface. The first pair of opposed surfaces is disposed on a lower portion of the interface. The second pair of opposed surfaces is disposed on an upper portion of the interface.

According to another aspect of the present invention the air bag door includes a flexible elongated hinge flange integrally extending from the interior surface of the door. While the mechanical interlock is the primary retention means prior to deployment, the hinge flange secondarily retains the door after air bag deployment. The hinge flange attaches the door to the vehicle structure behind the retainer and acts as a hinge to swing the door outward for air bag deployment while retaining the door to the vehicle structure. A suitable representative hinge structure of this type is described in more detail in U.S. Pat. No. 5,564,731, assigned to the assignee of the present invention and incorporated herein by reference.

According to another aspect of the present invention, the assembly includes a metal door insert disposed at least partially within the air bag door. The insert adds rigidity and/or dimensional stability to the door. The air bag door may also include a flexible elongated hinge flange that integrally extends from the interior surface of the door. The hinge flange may comprise a protruding portion of the metal door insert rather than an integral plastic flange as in the first embodiment.

According to another aspect of the present invention the retainer material is a hard rigid plastic.

According to another aspect of the present invention the air bag door is made of a plastic such as TPO, that is more flexible than that of the retainer. The air bag door may also be constructed using a hard material that does not easily adhere to the retainer material.

The air bag cover assembly is constructed by first providing a mold cavity shaped to make an integral retainer/door combination of a desired shape. The preformed air bag door is then provided in a door portion of the mold cavity. Molten retainer material is then injected into a retainer portion of the mold cavity surrounding the door portion of the mold cavity so that the retainer material flows around the door to form a mechanical interlock with the outer edges of the door. The retainer material is allowed to harden and the retainer/door combination is removed from the mold cavity.

According to another aspect of this method, an adhesion inhibitor may be provided on the outer edge of the door prior to the step of injecting molten retainer material. This may be accomplished by spraying silicone on the outer edge of the door.

According to another aspect of the present invention a skin covering may be provided over the exterior surfaces of the door and retainer.

According to another aspect of the present invention the skin may be vac-formed over the exterior surfaces of the door and retainer.

According to another aspect of the present invention the air bag door is formed with a profile in the door outer edge. This allows the molten retainer material to form a complementary profile when it flows around the air bag door during molding and contacts the profile in the air bag door edge.

BRIEF DRAWING DESCRIPTION

To better understand and appreciate the invention, refer to the following detailed description in connection with the accompanying drawings:

FIG. 3 is a cross-sectional side view of the air bag deployment assembly, air bag cover assembly and instrument panel of FIG. 2 with an air bag portion of the air bag deployment assembly in a deployed position;

FIG. 4 is a fragmentary cross-sectional side view of an air bag cover assembly constructed according to the present invention and including an air bag door constructed according to a second embodiment of the present invention;

FIG. 5 is a fragmentary cross-sectional side view of an air bag cover assembly constructed according to the present invention and including an alternative mechanical interlock profile;

FIG. 6 is a fragmentary cross-sectional side view of an air bag cover assembly constructed according to the present invention and including another alternative mechanical interlock profile;

FIG. 7 is a magnified cross-sectional side view of the mechanical interlock profile shown in the circled region in FIG. 2; and FIG. 8 is a fragmentary cross-sectional side view of an alternative mechanical interlock profile of an air bag cover assembly constructed according to the present invention.

PREFERRED EMBODIMENT DESCRIPTION

Figure 1:
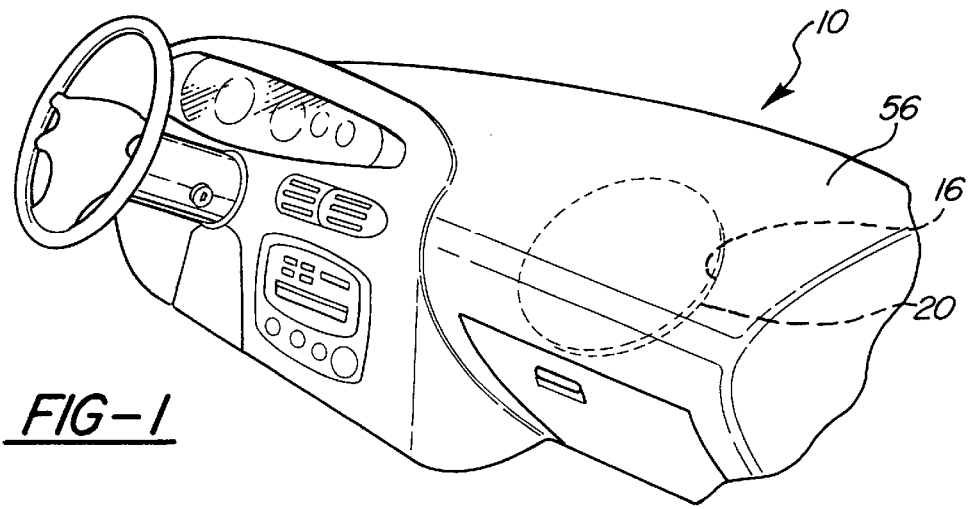
FIG. 1 is a perspective view of an air bag cover assembly constructed according to the present invention and installed in an automobile instrument panel.
Figure 2:
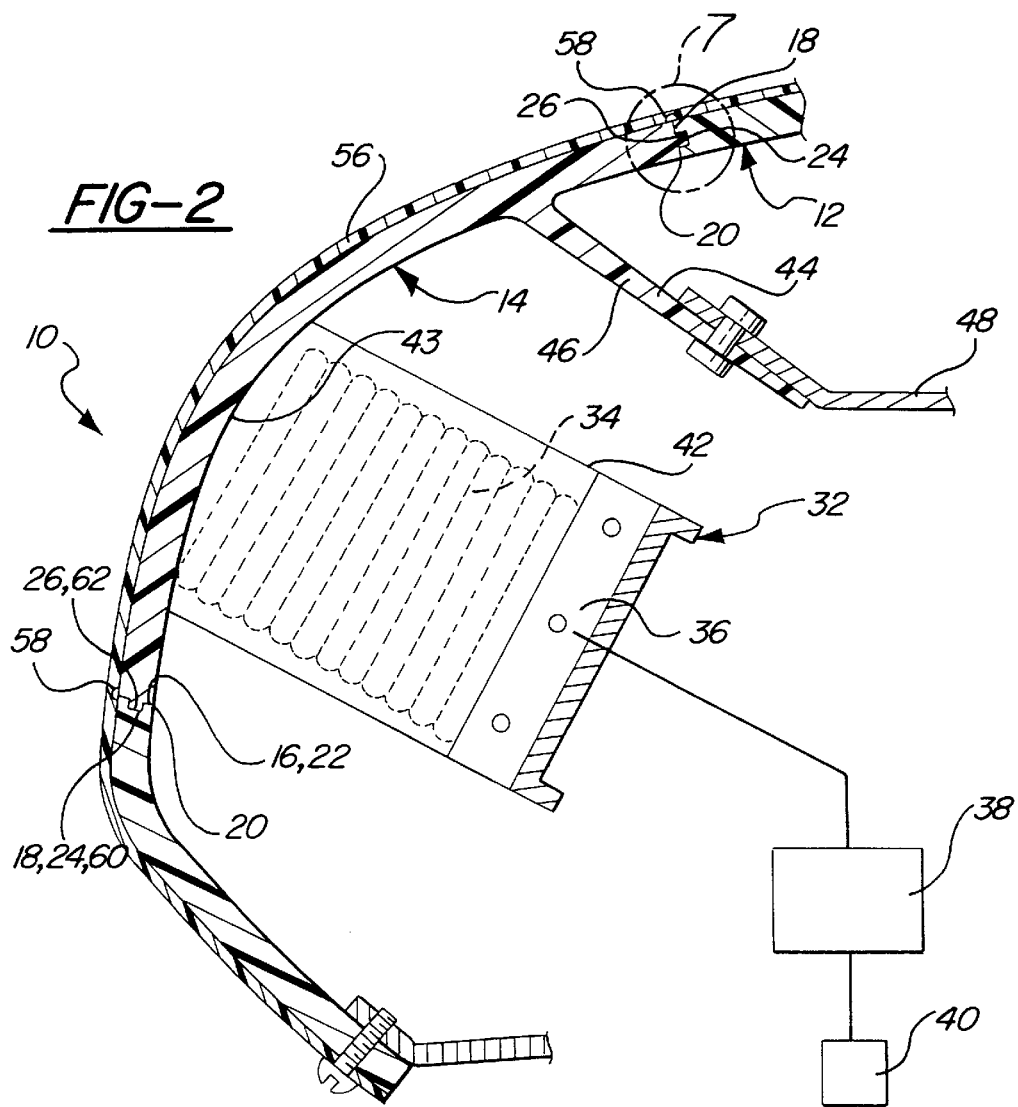
FIG. 2 is a cross sectional side view of an air bag deployment assembly disposed behind the air bag cover assembly and instrument panel of FIG. 1.

The air bag cover assembly generally shown at 10 in FIGS. 1, 2 and 3 represents a first embodiment of the invention. FIG. 1 shows the air bag cover assembly 10 installed in the passenger side of an automobile dashboard or instrument panel. Second and third embodiments are generally shown at 10' in FIG. 4 and 10" in FIG. 8, respectively. Reference numerals with the designation prime (') in FIG. 4 and double prime (") in FIG. 8 indicate alternative configurations of elements that also appear in the first embodiment. Where a portion of the following description uses a reference numeral to refer to the figures, I intend that portion of the description to apply equally to elements designated by primed numerals in FIG. 4 and double-primed numerals in FIG. 8.

The assembly 10 comprises a retainer, generally indicated at 12 in FIGS. 2, 3 and 7 and an integral air bag door, generally indicated at 14 in FIGS. 2, 3 and 7. The air bag door 14 is attached to the retainer 12 and is disposed in and closes a like-shaped air bag deployment opening 16 in the retainer 12. The door 14 has an outer edge, best shown at 18 in FIG. 3, which abuts and forms a seam 20 with an inner edge 22 of the air bag deployment opening 16.

As is best shown in FIGS. 2 and 7, there is a mechanical interlock between the air bag door 14 and the retainer 12 along at least a portion of the seam 20. The mechanical interlock comprises a first profile 24 formed in the air bag door outer edge 18 and a complementary second profile 26 formed in the inner edge 22 of the air bag deployment opening 16. The first profile 24 is disposed in a mating relationship with the second profile 26. Additional embodiments having alternative profile configurations are shown in FIGS. 5 and 6. Reference numerals with the subscript "s" in FIG. 5 and the subscript "v" in FIG. 8 indicate alternative configurations of elements that also appear in the first embodiment. Unless indicated otherwise, where a portion of the following description uses a reference numeral to refer to the figures, I intend that portion of the description to apply equally to elements designated by the subscript "s" in FIG. 5 and the subscript "v" in FIG. 6.

As best shown in FIG. 7, a first pair of opposed surfaces 28 are disposed along an interface between the respective first and second profiles 24, 26. One of the second pair of opposed surfaces 28 is disposed on the first profile 24 and the other of the second pair of opposed surfaces 28 is disposed on the second profile 26. The first pair of opposed surfaces 28 cooperate to block outward air bag door movement relative to the retainer 12. A second pair of opposed surfaces 30 is disposed along the interface between the two profiles with one of the second pair of opposed surfaces disposed on the first profile 24 and the other of the second pair of opposed surfaces disposed on the second profile 26. The second pair of opposed surfaces cooperatively blocks inward air bag door movement relative to the retainer 12.

The mechanical interlock supports the air bag door 14 in the retainer 12 against both inwardly and outwardly directed forces without adhesively bonding the air bag door 14 to the retainer 12 and without using separate fasteners to connect the air bag door 14 to the retainer 12. In other words, the invention provides an integral air bag door 14 that is removably held in place in an air bag deployment opening 16 in the retainer 12 by simple non-adhesive means and without using separate fasteners to join door 14 to retainer 12. Instead, the door 14 is mechanically locked against inward and outward movement relative to the retainer 12.

The retainer 12 is a contoured panel made of a hard rigid plastic such as Noryl, a formulation of poly phenylene oxide (PPO) and polystyrene (PS) available from General Electric; Pulse, a formulation of polycarbonate and acrylonitrile-butadiene styrene terpolymer (PC/ABS) available from Dow Chemical; or Dylark, a formulation of styrene maleic anhydride copolymer (SMA), available from Arco Chemical, and serves as a support structure of the instrument panel. The retainer may also be made from hard rigid plastics including olefins, esters, and urethanes. The retainer 12 is configured to secure to a frame portion (not shown) of the automobile.

Behind the air bag cover assembly 10 is a passenger air bag assembly generally indicated at 32 in FIGS. 2 and 3. The passenger air bag assembly 32 consists of an air bag 34, a gas generator 36, a controller 38 and a sensor 40. The gas generator 36 is mounted within a housing 42 that is secured to a suitable vehicle component not shown. In FIG. 2 the air bag 34 is shown in a deflated and folded state and is connected to and located above the housing. In FIG. 3 the air bag 34 is shown in a deployed state. The gas generator 36 supplies a suitable pressurized gas to the interior of the air bag 34 to inflate the air bag 34 when a sudden acceleration actuates the sensor 40 and the sensor 40 provides a signal to the controller 38 to generate gas. As the air bag 34 expands during inflation, it impacts against an interior door surface 43 to cause the door 14 to swing outwardly about a hinged connection 44 and provide an opening 16 through which the air bag 34 deploys rearwardly into the front passenger compartment of the automobile.

The air bag door 14 is made of a plastic more flexible than the retainer 12 such as a thermoplastic olefin (TPO) or may be constructed using a hard plastic material that generally does not easily adhere with the retainer material. The air bag door material is most likely different than the material that the retainer 12 is made of. The door material generally does not adhere with the retainer material in the sense that the materials will not bond to one another with any appreciable strength.

The air bag door 14 includes a flexible elongated hinge flange shown at 46 in FIGS. 2 and 3. The hinge flange 46 integrally extends from the interior surface 43 of the door 14. While the mechanical interlock is the primary retention means prior to deployment, the hinge flange 46 secondarily retains the door 14 prior to deployment and becomes the primary retention means during and after air bag 34 deployment. The hinge flange 46 extends diagonally outwardly from the interior door surface 43 and, as shown in FIGS. 2 and 3, attaches the door 14 to a vehicle structure 48 behind the retainer 12. The hinge flange 46 allows the door 14 to swing outward during air bag deployment while retaining the door 14 to the vehicle structure 48. A suitable representative hinge flange structure is described in more detail in U.S. Pat. No. 5,564,731 which is assigned to the assignee of the present invention and is incorporated herein by reference.

According to the second embodiment, the air bag cover assembly 10' includes a steel door insert shown at 50 in FIG. 4. The steel door insert 50 is disposed at least partially within the air bag door 14' to add rigidity or dimensional stability to the door 14'. In an air bag door 14' constructed according to the second embodiment the hinge flange 46' that integrally extends from the interior surface of the door 14' may comprise a protruding portion of the metal door insert 50 rather than an integral plastic flange 46 as in the first embodiment. The door insert 50 of the second embodiment may alternatively be made from suitably rigid and dimensionally stable materials other than steel.

The exterior class A surfaces of the door 14 and retainer 12 preferably lie flush with one another. Likewise, the interior surfaces of the door 14 and retainer 12 preferably lie flush with one another.

As shown in FIG. 7, a layer of an adhesion inhibitor 52 is disposed between the air bag door outer edge 18 and the inner edge 22 of the air bag deployment opening 16. The adhesion inhibitor 52 keeps the respective door and opening edge surfaces 18, 22 from adhering and interfering with door opening during air bag 34 deployment. In the present embodiment the adhesion inhibitor 52 is a sprayed-on coating of silicone.

The assembly may include a skin, shown at 56 in FIGS. 1–3 and 7, adhesively applied across the flush retainer 12 and door 14 exterior surfaces, concealing the seam 20 between door 14 and retainer 12 from the view of vehicle occupants. As is best shown in FIG. 7, the skin 56 may be weakened along a region adjacent the seam 20 to guide tearing during air bag 34 deployment. The weakened portion of the skin 56 is preferably a groove, shown at 58 in FIG. 7. The groove 58 is formed into an inner surface of the skin 56. Any suitable method to include molding, grinding, cutting, laser scoring or melting may be used to form the groove 58.

As best shown in FIG. 7, the first profile 24 comprises an elongated rectangular protrusion 60 or ridge that extends integrally outward from and runs along the door outer edge 18. The second profile 26 comprises a recess 62 in the form of an elongated rectangular groove that extends into and runs along the inner edge 22 of the air bag deployment opening 16. The recess 62 is shaped to complement the shape of the ridge-shaped protrusion 60 and to receive the protrusion 60 in a mating relationship, forming an abutment interface between the door 14 and the retainer 12. The first pair of opposed surfaces 28 is disposed along an upper portion of the interface. The second pair of opposed surfaces 30 is disposed along a lower portion of the interface.

In other embodiments, the air bag cover assembly 10 may include no hinge flange 46. Such embodiments may include any one or more of a number of suitable tethering and retention means known in the art.

Other embodiments may include adhesion inhibitors other than silicone or may use no adhesion inhibitor. Such embodiments may rely instead on the low bond strength of the door and retainer materials to preclude any significant amount of adhesion between door 14 and retainer 12.

In other embodiments, any one or more of a number of suitable methods known in the art other than grooving may accomplish skin weakening. In addition other embodiments may include a foam layer between the door and retainer exterior surfaces and the skin 56.

In other embodiments the protrusion 60 and complementary recess 62 in the door outer edge 18 and retainer inner edge 22 profiles may be arcuate or semi-spherical as shown in FIG. 5 or V-shaped as shown in FIG. 6. As shown in FIG. 8, the second profile 26 may comprise a protrusion 64 extending integrally inward from along the inner edge 22 of the air bag deployment opening 16 rather than a recess. In such embodiments the first profile 24 comprises a complementary recess 66 disposed along the door outer edge 18 rather than a protrusion. As with the first embodiment, the protrusion 64 is disposed in a mating relationship with the complementary recess 66 and forms an abutment interface. However, where the general shape of the first profile 24 is a recess 66 and the general shape of the second profile 26 is a protrusion 64, the first pair of opposed surfaces is disposed on a lower portion of the interface. The second pair of opposed surfaces is disposed on an upper portion of the interface. The profiles may have any other suitable shape or combination of shapes so long as the profiles include two pairs of opposed surfaces that cooperate to resist inward and outward movement of the door 14 relative to the retainer 12.

In practice, the air bag cover assembly is preferably constructed by first providing a mold cavity shaped to make a door 14 of a desired shape. An air bag door 14 is then injection molded and pre-formed in the mold cavity to include a rectangular elongated ridge that extends outward from around the outer edge 18 of the door 14. The pre-formed air bag door 14 is then placed in a door portion of a second mold cavity to make the integral retainer/door combination 12, 14. The adhesion inhibitor, i.e., the silicone, is sprayed on the outer edge 18 of the door 14 prior to the door's placement in the second mold cavity. In other embodiments, the adhesion inhibitor may be applied by methods other than spraying. Molten retainer material is then injected into a retainer portion of the mold cavity surrounding the door portion of the mold cavity so that the retainer material flows around the door 14 to form a mechanical interlock with the outer edge 18 of the door 14. The retainer material is allowed to harden and the retainer/door combination 12, 14 is removed from the mold cavity. After retainer hardening, the skin covering 56 is vac-formed in place over the exterior surfaces of the door 14 and retainer 12. As an alternative, instead of vac-forming, a skin/foam-in-place method may be used.

In other embodiments which include no outer skin over the exterior surfaces of the door 14 and retainer 12, the seam 20 formed between the door 14 and retainer 12 may be left as a style line between the exterior door surface and the exterior retainer surface. Alternatively, the seam 20 may be enhanced by forming a channel along the seam 20 between the exterior door surface and the exterior retainer surface.

The description and drawings illustratively set forth my preferred invention embodiments. I intend the description and drawings to describe these embodiments and not to limit the scope of the invention. obviously, it is possible to modify these embodiments while remaining within the scope of the following claims. Therefore, within the scope of the claims, one may practice the invention otherwise than as the description and drawings specifically show and describe.

What is claimed is:

1. An air bag cover assembly comprising:

a retainer comprising an exterior retainer surface spaced from an interior retainer surface by a generally uniform retainer thickness, the retainer including an air bag deployment opening defined by an inner edge having an inner edge surface extending from the exterior retainer surface to the interior retainer surface;

an integral air bag door disposed in and closing the air bag deployment opening in the retainer, the door comprising an exterior door surface spaced from an interior door surface by a generally uniform door thickness and bounded by a door outer edge that abuts and forms a seam with the inner edge of the air bag deployment opening;

a mechanical interlock between the air bag door and the retainer along at least a portion of the seam, the mechanical interlock comprising a first profile formed in the air bag door outer edge and a complementary second profile formed in the inner edge of the air bag deployment opening, the first profile mating with the second profile;

a first pair of opposed surfaces disposed on the respective first and second profiles; the first pair of opposed surfaces cooperatively blocking outward air bag door movement relative to the retainer; the improvement comprising:

a second pair of opposed surfaces disposed on the respective first and second profiles, the second pair of opposed surfaces cooperatively blocking inward air bag door movement relative to the retainer so that the mechanical interlock supports the air bag door in the retainer against both inwardly and outwardly directed forces;

the door being made of a door material and the retainer being made of a retainer material, the door material having a bonding strength with the retainer material, the bonding strength being low enough to prevent the door from adhering to the retainer.

2. An air bag cover assembly as defined in claim 1 in which the assembly includes a skin adhesively applied across respective exterior surfaces of the door and the retainer.

3. An air bag cover assembly as defined in claim 2 in which the skin is weakened along a region adjacent the seam.

4. An air bag cover assembly as defined in claim 1 in which the first profile comprises a protrusion extending integrally outward from along the door outer edge and the second profile comprises a complementary recess disposed along the inner edge of the air bag deployment opening, the protrusion mating with the complementary recess and forming an abutment interface, the first pair of opposed surfaces disposed on an upper portion of the interface and the second pair of opposed surfaces disposed on a lower portion of the interface.

5. An air bag cover assembly as defined in claim 1 in which the second profile comprises a protrusion extending integrally inward from along the inner edge of the air bag deployment opening and the first profile comprises a complementary recess disposed along the door outer edge, the protrusion mating with the complementary recess and forming an abutment interface, the first pair of opposed surfaces disposed on a lower portion of the interface and the second pair of opposed surfaces disposed on an upper portion of the interface.

6. An air bag cover assembly as defined in claim 1 in which the air bag door includes a flexible elongated hinge flange integrally extending from the interior surface of the door.

7. An air bag cover assembly as defined in claim 1 in which the assembly includes a metal door insert disposed at least partially within the air bag door.

8. An air bag cover assembly as defined in claim 7 in which the air bag door includes a flexible elongated hinge flange integrally extending from the interior surface of the door, the hinge flange comprising a protruding portion of the metal door insert.

9. An air bag cover assembly comprising:

a retainer comprising an exterior retainer surface spaced from an interior retainer surface by a generally uniform retainer thickness, the retainer including an air bag deployment opening defined by an inner edge having an inner edge surface extending from the exterior retainer surface to the interior retainer surface;

an integral air bag door disposed in and closing the air bag deployment opening in the retainer, the door comprising an exterior door surface spaced from an interior door surface by a generally uniform door thickness and bounded by a door outer edge that abuts and forms a seam with the inner edge of the air bag deployment opening;

a mechanical interlock between the air bag door and the retainer along at least a portion of the seam, the mechanical interlock comprising a first profile formed in the air bag door outer edge and a complementary second profile formed in the inner edge of the air bag deployment opening, the first profile mating with the second profile;

a first pair of opposed surfaces disposed on the respective first and second profiles; the first pair of opposed surfaces cooperatively blocking outward air bag door movement relative to the retainer; the improvement comprising:

a second pair of opposed surfaces disposed on the respective first and second profiles, the second pair of opposed surfaces cooperatively blocking inward air bag door movement relative to the retainer so that the mechanical interlock supports the air bag door in the retainer against both inwardly and outwardly directed forces; and a layer of an adhesion inhibitor disposed between the air bag door outer edge and the inner edge of the air bag deployment opening.

10. An air bag cover assembly as defined in claim 9 in which the adhesion inhibitor comprises silicone.

11. An air bag cover assembly comprising:

a retainer comprising an exterior retainer surface spaced from an interior retainer surface by a generally uniform retainer thickness, the retainer including an air bag deployment opening defined by an inner edge having an inner edge surface extending from the exterior retainer surface to the interior retainer surface;

an integral air bag door disposed in and closing the air bag deployment opening in the retainer, the door comprising an exterior door surface spaced from an interior door surface by a generally uniform door thickness and bounded by a door outer edge that abuts and forms a seam with the inner edge of the air bag deployment opening;

a mechanical interlock between the air bag door and the retainer along at least a portion of the seam, the mechanical interlock comprising a first profile formed in the air bag door outer edge and a complementary second profile formed in the inner edge of the air bag deployment opening, the first profile mating with the second profile;

a first pair of opposed surfaces disposed on the respective first and second profiles; the first pair of opposed surfaces cooperatively blocking outward air bag door movement relative to the retainer; the improvement comprising:

a second pair of opposed surfaces disposed on the respective first and second profiles, the second pair of opposed surfaces cooperatively blocking inward air bag door movement relative to the retainer so that the mechanical interlock supports the air bag door in the retainer against both inwardly and outwardly directed forces;

the interior door and retainer surfaces being disposed parallel to and generally coplanar with one another where the door outer edge and the inner edge of the air bag deployment opening abut one another.

12. An air bag cover assembly as defined in claim 11 in which the exterior door and retainer surfaces lie parallel to and generally coplanar with one another where the door outer edge and the inner edge of the air bag deployment opening abut one another.

13. An air bag cover assembly comprising:

a retainer comprising an exterior retainer surface spaced from an interior retainer surface by a generally uniform retainer thickness, the retainer including an air bag deployment opening defined by an inner edge having an inner edge surface extending from the exterior retainer surface to the interior retainer surface;

an integral air bag door disposed in and closing the air bag deployment opening in the retainer, the door comprising an exterior door surface spaced from an interior door surface by a generally uniform door thickness and bounded by a door outer edge that abuts and forms a seam with the inner edge of the air bag deployment opening;

a mechanical interlock between the air bag door and the retainer along at least a portion of the seam, the mechanical interlock comprising a first profile formed in the air bag door outer edge and a complementary second profile formed in the inner edge of the air bag deployment opening, the first profile mating with the second profile;

a first pair of opposed surfaces disposed on the respective first and second profiles; the first pair of opposed surfaces cooperatively blocking outward air bag door movement relative to the retainer; the improvement comprising:

a second pair of opposed surfaces disposed on the respective first and second profiles, the second pair of opposed surfaces cooperatively blocking inward air bag door movement relative to the retainer so that the mechanical interlock supports the air bag door in the retainer against both inwardly and outwardly directed forces;

the retainer material being a hard rigid plastic.

14. An air bag cover assembly comprising:

a retainer comprising an exterior retainer surface spaced from an interior retainer surface by a generally uniform retainer thickness, the retainer including an air bag deployment opening defined by an inner edge having an inner edge surface extending from the exterior retainer surface to the interior retainer surface;

an integral air bag door disposed in and closing the air bag deployment opening in the retainer, the door comprising an exterior door surface spaced from an interior door surface by a generally uniform door thickness and bounded by a door outer edge that abuts and forms a seam with the inner edge of the air bag deployment opening;

a mechanical interlock between the air bag door and the retainer along at least a portion of the seam, the mechanical interlock comprising a first profile formed in the air bag door outer edge and a complementary second profile formed in the inner edge of the air bag deployment opening, the first profile mating with the second profile;

a first pair of opposed surfaces disposed on the respective first and second profiles; the first pair of opposed surfaces cooperatively blocking outward air bag door movement relative to the retainer; the improvement comprising:

a second pair of opposed surfaces disposed on the respective first and second profiles, the second pair of opposed surfaces cooperatively blocking inward air bag door movement relative to the retainer so that the mechanical interlock supports the air bag door in the retainer against both inwardly and outwardly directed forces;

the air bag door being made of a plastic more flexible than that of said retainer.

15. A method for making an air bag cover assembly comprising a retainer comprising an exterior retainer surface spaced from an interior retainer surface by a generally uniform retainer thickness, the retainer including an air bag deployment opening defined by an inner edge having an inner edge surface extending from the exterior retainer surface to the interior retainer surface, an integral air bag door disposed in and closing the air bag deployment opening in the retainer, the door comprising an exterior door surface spaced from an interior door surface by a generally uniform door thickness and bounded by a door outer edge that abuts and forms a seam with the inner edge of the air bag deployment opening, a mechanical interlock between the air bag door and the retainer along at least a portion of the seam, the mechanical interlock comprising a first profile formed in the air bag door outer edge and a complementary second profile formed in the inner edge of the air bag deployment opening, the first profile mating with the second profile, a first pair of opposed surfaces disposed on the respective first and second profiles, the first pair of opposed surfaces cooperatively blocking outward air bag door movement relative to the retainer, a second pair of opposed surfaces disposed on the respective first and second profiles, the second pair of opposed surfaces cooperatively blocking inward air bag door movement relative to the retainer; the method including the steps of:

providing a mold cavity shaped to make an integral retainer/door combination of a desired shape;

providing the preformed air bag door in a door portion of the mold cavity;

providing molten retainer material into a retainer portion of the mold cavity surrounding the door portion of the mold cavity so that the retainer material flows around the door to form a mechanical interlock with the door outer edges;

allowing the retainer material to harden; and removing the retainer/door combination from the mold cavity.

16. The method of claim 15 including the additional step of providing a skin covering over the exterior surfaces of the door and retainer.

17. The method of claim 16 in which the step of providing a skin includes the step of vac-forming a skin over exterior surfaces of the door and retainer.

18. The method of claim 15 in which the step of providing an air bag door includes the step of forming the air bag door with a profile in the door outer edge.

19. A method for making an air bag cover assembly comprising a retainer comprising an exterior retainer surface spaced from an interior retainer surface by a generally uniform retainer thickness, the retainer including an air bag deployment opening defined by an inner edge having an inner edge surface extending from the exterior retainer surface to the interior retainer surface, an integral air bag door disposed in and closing an air bag deployment opening in the retainer, the door comprising an exterior door surface spaced from an interior door surface by a generally uniform door thickness and bounded by a door outer edge that abuts and forms a seam with the inner edge of the air bag deployment opening, a mechanical interlock between the air bag door and the retainer along at least a portion of the seam, the mechanical interlock comprising a first profile formed in the air bag door outer edge and a complementary second profile formed in the inner edge of the air bag deployment opening, the first profile mating with the second profile, a first pair of opposed surfaces disposed on the respective first and second profiles, the first pair of opposed surfaces cooperatively blocking outward air bag door movement relative to the retainer, a second pair of opposed surfaces disposed on the respective first and second profiles, the second pair of opposed surfaces cooperatively blocking inward air bag door movement relative to the retainer; the method including the steps of:

provending a mold cavity shaped to make an integral retainer/door combination of a desired shape;

providing the preformed air bag door in a door portion of the mold cavity;

providing molten retainer material into a retainer portion of the mold cavity surrounding the door portion of the mold cavity so that the retainer material flows around the door to form a mechanical interlock with the door outer edges;

allowing the retainer material to harden;

removing the retainer/door combination from the mold cavity; and providing an adhesion inhibitor on the outer edge of the door prior to the step of injecting molten retainer material.

20. The method of claim 19 in which the step of providing an adhesion inhibitor includes the step of applying silicone on the outer edge of the door.

* * * * *